Nov. 19, 1929.  I. J. REUTER  1,735,908
ROADSTER REAR SEAT
Filed Jan. 3, 1927

Inventor
Irving J. Reuter

By Blackmore, Spencer & Phil—
Attorneys

Patented Nov. 19, 1929

1,735,908

UNITED STATES PATENT OFFICE

IRVING J. REUTER, OF LANSING, MICHIGAN, ASSIGNOR TO GENERAL MOTORS CORPORATION, OF DETROIT, MICHIGAN, A CORPORATION OF DELAWARE

ROADSTER REAR SEAT

Application filed January 3, 1927. Serial No. 158,667.

This invention relates to automobile bodies of the roadster and coupe type, which embody a single main seat for two or three passengers, with a storage compartment to the rear thereof. Recently, the practice has been to provide an emergency or auxiliary seat, normally folded and concealed within the storage compartment, but which may be opened to form a rumble or dickey seat for additional passengers.

With the present trend toward shorter wheel bases, some difficulty has been experienced in the provision of ample leg room for comfort of rumble seat passengers, and it is one of the objects of the present invention to provide a dickey seat construction particularly adaptable for short length bodies, affording an abundance of leg space.

A further object of the invention is to provide a comparatively large opening in the rear deck for convenience of entry and exit of occupants and to further provide a sectional door or closure for the opening, the sections being inter-connected for unisonal movement to opened or closed positions, with one of the sections serving as a back rest for the seat, when in opened position.

Figure 1:
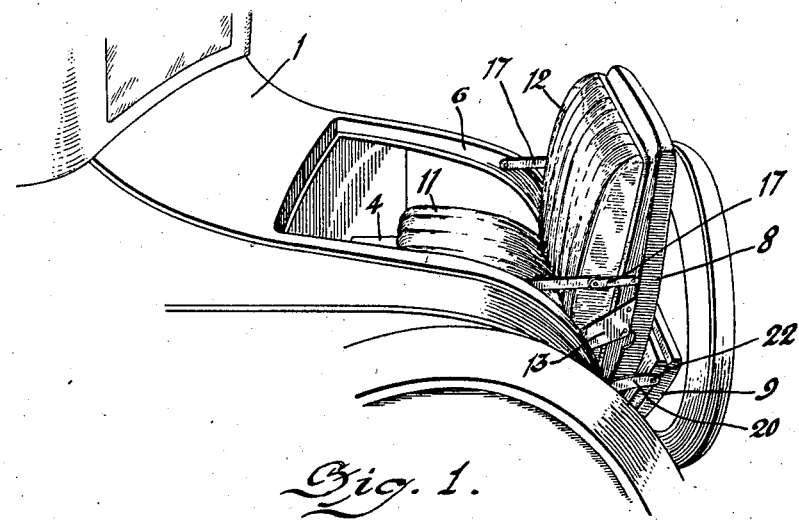
Figure 2:
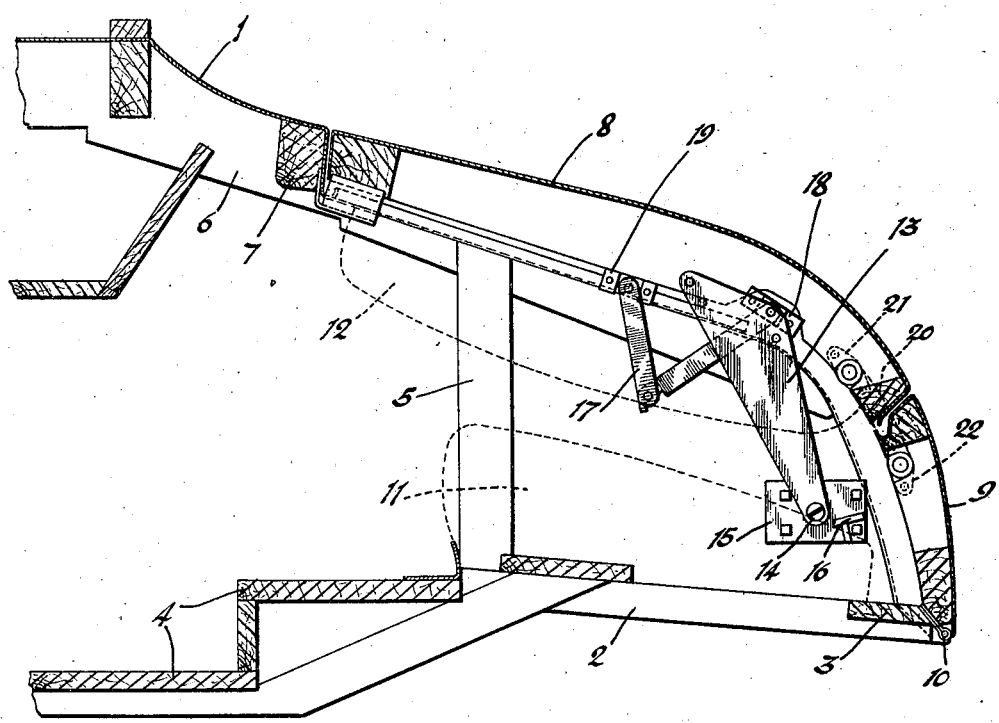

Other objects and advantages will be apparent from the following specification and the accompanying drawing, wherein Fig. 1 is a perspective view of a rear portion of an automobile body, showing the rumble seat in opened position, and Fig. 2 is a longitudinal sectional view of the body with the rear deck closed.

Referring to the preferred, but not necessarily the only embodiment of the invention, as shown in the drawing, the rear deck of a coupe or roadster body is indicated at 1, and consists of a skeleton framework of wood or metal, covered by metallic sheathing, as is the customary practice in providing a storage compartment. Longitudinally extending sills 2, connected at their rear ends by the transverse sill 3, rest on and are for attachment to the chassis frame, and also carry the floor boards 4. Vertical side struts, as indicated at 5, extend upwardly to brace the upper sills 6, which conform to and define the rear deck contour, the upper sills 6 on the respective sides of the deck being connected by the transverse cross bar 7.

The greater portion of the upper side of the rear deck is cut away, as will be apparent from the drawing, the opening being shown extending from the cross bar 7 to the end of the body at the transverse sill 3. The door or cover for the opening comprises complementary sections 8 and 9, consisting of frames covered with metal sheets, for closing the fore and aft portions of the opening respectively, the section 9 being hinged or pivoted at 10, at the end of the body, and adapted to swing rearwardly beyond the end of the body and behind the section 8 when in open position, at which time the section 8, extends upwardly from the end of the body in the closed plane of the section 9, and affords a back rest for the seat. Seat and back cushions are indicated at 11 and 12. Bracket arms 13 are fastened by screws to the frame of the section 8, at either side, and extend downwardly into the compartment and each arm is pivotally connected at 14 to a fastening plate 15, which is provided with lug or ear 16, to afford a stop or rest for the arm, when the seat is opened. A toggle link 17 pivoted to a plate 18 on the upper sill 6, and to the plate 19 on the frame of the back rest section 8, serves as a brace for the back rest.

It will be seen that the rumble seat extends to the very rear edge or end of the automobile body, thus utilizing all the available space, and that the size of the section 8 in affording a back rest of proper height only partially closes the large opening in the deck, necessitating the additional section 9 to form a continuation of the section 8 and complete the closure of the opening. To permit access to the rumble seat it becomes necessary to swing the section 9 rearwardly and out of the path of swinging movement of the section 8. In the present instance, it is proposed to move the sections in unison, out of the respective intersecting paths of each other, by a pivotal interconnection between the sections, which consists of a link 20, pivotally mounted to fastening plates 21 and 22 on the respective sections. Thus when the section 8 is swung about its pivot 14, the link causes the section 9 to swing rearwardly about its pivot or hinge 10, to the position shown in Fig. 1. The arrangement of the pivots and linkage is such that the lower section 9 opens very much more rapidly at the start than does the upper section 8, in order to be clear of the range of relative swinging movement of the section 8 in the least possible time.

While the invention has been described more or less specifically, it is to be understood that such obvious modifications may be made as come within the scope of the appended claims.

Having described the invention, I claim:

1. An automobile body having a rear deck with an opening therein, a seat within the rear deck, and a closure for said opening, including sections pivoted respectively to the body and having intersecting paths of swinging movement and links pivotally connecting adjacent ends of said sections to each other, whereby said sections are moved in unison out of the swinging paths of each other to permit access to said seat, one of said sections constituting a back rest for said seat when in open position.

2. An automobile body having a rear deck with an opening therein, a seat within the rear deck, a pivoted closure member for the opening, adapted to swing rearwardly to form a back rest for the seat, a second pivoted closure member, lying when in closed position in the path of swinging movement of said first mentioned closure member, and a link pivotally connecting said members to each other, whereby said second member is moved out of the path of swinging movement of the first mentioned member.

3. An automobile body having a rear deck with an opening therein, a seat within the rear deck, a section pivoted to the body and adapted when in open position to form a back rest for the seat and when in closed position to partially close said opening, an auxiliary section pivoted to the body and adapted to lie to the rear of said first mentioned section when in opened position and to form a continuation of said section to completely close the opening when in closed position, and means effecting the movement of said sections in unison about their respective pivots and out of the range of swinging movement of each other.

4. An automobile body having a rear deck with an opening therein, a seat within the rear deck, a pivoted closure member for the rear part of the opening, a pivoted closure member for the fore part of the opening adapted to be swung open to an upright position in the plane of the rear closure member to form a back rest for said seat, and means to swing said rear closure member out of the upright plane of the open front closure member in unison with the swinging movement thereof.

5. A motor vehicle body wherein a rear deck is provided with a closure door formed in sections, each independently pivoted to the body for swinging movement through intersecting paths of travel and forming one with the other a continuation of the rear deck top panel when in closed position, and which when in open position are located one behind the other, characterized by means interconnecting said sections and being adapted to move the sections in unison about their respective pivots and out of the paths of movement of each other.

6. A motor vehicle body wherein a rear deck is provided with a closure door formed in sections, each independently pivoted to the body for swinging movement through intersecting paths of travel and forming one with the other a continuation of the rear top panel when in closed position, and which when in open position are located one behind the other, characterized by a link having pivotal connection with the respective door sections and adapted upon swinging movement of one section to cause the swinging movement of the other section at a faster rate of travel than that of the former.

In testimony whereof I affix my signature.

IRVING J. REUTER.